United States Patent
Chuang et al.

(10) Patent No.: US 10,477,234 B2
(45) Date of Patent: *Nov. 12, 2019

(54) METHOD AND APPARATUS FOR DERIVATION OF MOTION VECTOR PREDICTOR CANDIDATE SET

(71) Applicant: HFI Innovation Inc., Zhubei, Hsinchu County (TW)

(72) Inventors: Tzu-Der Chuang, Zhubei (TW); Jian-Liang Lin, Yilan County (TW); Yu-Wen Huang, Taipei (TW); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,218

(22) Filed: Nov. 5, 2018

(65) Prior Publication Data

US 2019/0075315 A1 Mar. 7, 2019

Related U.S. Application Data

(63) Continuation of application No. 15/832,987, filed on Dec. 6, 2017, now Pat. No. 10,154,279, which is a continuation of application No. 14/239,302, filed as application No. PCT/CN2012/083133 on Oct. 18, 2012, now Pat. No. 9,872,016.

(Continued)

(51) Int. Cl.
*H04N 19/52* (2014.01)
*H04N 19/51* (2014.01)
(Continued)

(52) U.S. Cl.
CPC ............ *H04N 19/52* (2014.11); *H04N 19/50* (2014.11); *H04N 19/51* (2014.11); *H04N 19/593* (2014.11); *H04N 19/70* (2014.11)

(58) Field of Classification Search
CPC .......... H04N 19/52; H04N 19/50; H04N 19/51
(Continued)

(56) References Cited

U.S. PATENT DOCUMENTS

| 2011/0013697 A1 | 1/2011 | Choi |
| 2011/0194609 A1 | 8/2011 | Rusert et al. |

(Continued)

FOREIGN PATENT DOCUMENTS

| WO | 2009/051419 A2 | 4/2009 |
| WO | 2011/010858 A2 | 1/2011 |

OTHER PUBLICATIONS

Chen, J., et al; "MVP Index Parsing with Fixed Number of Candidates," Joint Collaborative Team on Video Coding (JCT-VC) of ITU-T SG16 WP3 and ISO/IEC JTC1/SC29/WH11; Jul. 2011; pp. 1-14.

(Continued)

*Primary Examiner* — Jeremiah C Hallenbeck-Huber
*Assistant Examiner* — Amir Shahnami
(74) *Attorney, Agent, or Firm* — McClure, Qualey & Rodack, LLP

(57) ABSTRACT

A method and apparatus derive a motion vector predictor (MVP) candidate set for a block. Embodiments according to the present invention determine a plurality of spatial neighboring blocks of the block, obtain one or more spatial MVP candidates from motion vectors associated with the spatial neighboring blocks, determine whether one or more redundant MVP candidates exist in the spatial MVP candidates, generate a first MVP candidate set, wherein said generating the first MVP candidate set comprises not including the determined one or more redundant MVP candidates into the first MVP candidate set, and generate a final MVP candidate set according to the first MVP candidate set.

9 Claims, 8 Drawing Sheets

Related U.S. Application Data

(60) Provisional application No. 61/548,991, filed on Oct. 19, 2011.

(51) Int. Cl.
  *H04N 19/70* (2014.01)
  *H04N 19/593* (2014.01)
  *H04N 19/50* (2014.01)

(58) Field of Classification Search
  USPC .................................................... 375/240.16
  See application file for complete search history.

(56) References Cited

U.S. PATENT DOCUMENTS

| | | |
|---|---|---|
| 2012/0320969 A1 | 12/2012 | Zheng |
| 2013/0003850 A1 | 1/2013 | Sugio |
| 2013/0003851 A1 | 1/2013 | Yu |

OTHER PUBLICATIONS

Lin, J.L., et al.; "CE9: Results of Experiment ROB04;" Joint Collaborative Team on Video Coding (JCT-VC) of ITU-T SG16 WP3 and ISO/IEC JTC1/SC29/WH11; Jul. 2011; pp. 1-8.
Jeon, Y.; "Non-CE9/Non-CE13: New MVP Positions for Merge/Skip Modes and its Combination with Replacing Redundant MVPs;" Joint Collaborative Team on Video Coding (JCT-VC) of ITU-T SG16 WP3 and ISO/IEC JTC1/SC29/WH11; Nov. 2011; pp. 1-14.
Lin, J.L., et al.; "CE13: Results of Tests 1, 3d and 3e in Section 3.1 on Replacing Redundant MVPs and its combination with Adaptive MVP List Size;" Joint Collaborative Team on Video Coding (JCT-VC) of ITU-T SG16 WP3 and ISO/IEC JTC1/SC29/WH11; Nov. 2011; pp. 1-8.

| Merge_idx | L0 | L1 |
|---|---|---|
| 0 | mvL0_A, ref0 | - |
| 1 | - | mvL1_B, ref0 |
| 2 | | |
| 3 | | |
| 4 | | |

| Merge_idx | L0 | L1 |
|---|---|---|
| 0 | mvL0_A, ref0 — 310 | L1 |
| 1 | | mvL1_B, ref0 — 320 |
| 2 | mvL0_A, ref0 | mvL1_B, ref0 |
| 3 | | |
| 4 | | |

| Merge_idx | L0 | L1 |
|---|---|---|
| 0 | mvL0_A, ref0 | - |
| 1 | - | mvL1_A, ref1 |
| 2 | | |
| 3 | | |
| 4 | | |

| Merge_idx | L0 | L1 |
|---|---|---|
| 0 | mvL0_A, ref0 | - |
| 1 | - | mvL1_A, ref1 |
| 2 | mvL0_A, ref0 → | mvL0'_A, ref0' |
| 3 | mvL1'_A, ref1' | ← mvL1_A, ref1 |
| 4 | | |

410 — 420

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | - | - |
| 4 | - | - |

*Fig. 5A*

| Merge_idx | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | (0,0), ref0 | (0,0), ref0 |
| 4 | (0,0), ref1 | (0,0), ref1 |

| amvp_idx | L0 | amvp_idx | L1 |
|---|---|---|---|
| 0 | mvL0_A | 0 | mvL1_A |
| 1 | mvL0_B | 1 | - |
| 2 | - | 2 | - |

*Fig. 5C*

| amvp_idx | L0 | amvp_idx | L1 |
|---|---|---|---|
| 0 | mvL0_A | 0 | mvL1_A |
| 1 | mvL0_B | 1 | (0,0) |
| 2 | (0,0) | 2 | - |

METHOD AND APPARATUS FOR DERIVATION OF MOTION VECTOR PREDICTOR CANDIDATE SET

CROSS REFERENCE TO RELATED APPLICATIONS

The present invention is a Continuation of pending U.S. patent application Ser. No. 15/832,987, filed on Dec. 6, 2017, (now patented as U.S. Pat. No. 10,154,279) which is a Continuation of U.S. patent application Ser. No. 14/239,302, filed on Feb. 18, 2014 (now patented as U.S. Pat. No. 9,872,016), which is a National Phase of PCT Application No. PCT/CN2012/083133, filed on Oct. 18, 2012, which claims priority to U.S. Provisional Patent Application, Ser. No. 61/548,991, filed on Oct. 19, 2011, entitled "Complete MVP Candidate Set". The Applications are hereby incorporated by reference in their entireties.

FIELD OF THE INVENTION

The present invention relates to video coding. In particular, the present invention relates to derivation of motion vector predictor (MVP) candidate set for High Efficiency Video Coding (HEVC).

BACKGROUND

High-Efficiency Video Coding (HEVC) is a new international video coding standard that is being developed by the Joint Collaborative Team on Video Coding (JCT-VC). HEVC is based on the hybrid block-based motion-compensated DCT-like transform coding architecture. The basic unit for compression, termed Coding Unit (CU), is a 2N×2N square block, and each CU can be recursively split into four smaller CUs until a predefined minimum size is reached. Each CU contains one or multiple Prediction Units (PUs). The PU sizes can be 2N×2N, 2N×N, 2N×nU, 2N×nD, N×2N, nL×2N, nR×2N, or N×N, where 2N×N, 2N×nU, 2N×nD and N×2N, nL×2N, nR×2N correspond to horizontal and vertical partition of a 2N×2N PU with symmetric or asymmetric PU size division respectively.

To further increase the coding efficiency of motion vector coding in HEVC, the motion vector competition (MVC) based scheme is applied to select one motion vector predictor (MVP) among a given MVP candidate set which includes spatial and temporal MVPs. There are three inter-prediction modes including Inter, Skip, and Merge in the HEVC test model version 3.0 (HM-3.0). The Inter mode performs motion-compensated prediction with transmitted Motion Vector Differences (MVDs) that can be used together with MVPs for deriving motion vectors (MVs). The Skip and Merge modes utilize motion inference methods (MV=MVP+MVD where MVD is zero) to obtain the motion information from spatial neighboring blocks (spatial candidates) or temporal blocks (temporal candidates) located in a co-located picture. The co-located picture is the first reference picture in list 0 or list 1, which is signaled in the slice header.

When a PU is coded in either Skip or Merge mode, no motion information is transmitted except for the index of the selected candidate. In the case of a Skip PU, the residual signal is also omitted. For the Inter mode in HM-3.0, the Advanced Motion Vector Prediction (AMVP) scheme is used to select a motion vector predictor among an AMVP candidate set including two spatial MVPs and one temporal MVP. As for the Merge and Skip mode in HM-3.0, the Merge scheme is used to select a motion vector predictor among a Merge candidate set containing four spatial MVPs and one temporal MVP.

For the Inter mode, the reference picture index is explicitly transmitted to the decoder. The MVP is then selected among the candidate set for a given reference picture index. FIG. 1 illustrates the MVP candidate set for the Inter mode according to HM-3.0, where the MVP candidate set includes two spatial MVPs and one temporal MVP:
1. Left predictor (the first available MV from $A_0$ and $A_1$),
2. Top predictor (the first available MV from $B_0$, $B_1$, and $B_{n+1}$), and
3. Temporal predictor (the first available MV from $T_{BR}$ and $T_{CTR}$).

A temporal predictor is derived from a block ($T_{BR}$ or $T_{CTR}$) in a co-located picture, where the co-located picture is the first reference picture in list 0 or list 1. The block associated with the temporal MVP may have two MVs: one MV from list 0 and one MV from list 1. The temporal MVP is derived from the MV from list 0 or list 1 according to the following rule:
1. The MV that crosses the current picture is chosen first, and
2. If both MVs cross the current picture or both do not cross, the MV with the same reference list as the current list will be chosen.

In HM-3.0, if a particular block is encoded in the Merge mode, an MVP index is signaled to indicate which MVP among the MVP candidate set is used for this block to be merged. To follow the essence of motion information sharing, each merged PU reuses the MV, prediction direction, and reference picture index of the selected candidate. It is noted that if the selected MVP is a temporal MVP, the reference picture index is always set to the first reference picture. FIG. 2 illustrates the MVP candidate set for the Merge mode according to HM-3.0, where the MVP candidate set includes four spatial MVPs and one temporal MVP:
1. Left predictor ($A_m$),
2. Top predictor ($B_n$),
3. Temporal predictor (the first available MV from $T_{BR}$ or $T_{CTR}$),
4. Above-right predictor ($B_0$), and
5. Below-left predictor ($A_0$).

In HM-3.0, a process is utilized in both Inter and Merge modes to avoid an empty candidate set. The process adds a candidate with a zero MV to the candidate set when no candidate can be inferred in the Inter, Skip or Merge mode.

Based on the rate-distortion optimization (RDO) decision, the encoder selects one final MVP for Inter, Skip, or Merge modes from the given MVP list and transmits the index of the selected MVP to the decoder after removing redundant MVPs in the list. However, because the temporal MVP is included in the MVP list, any transmission error may cause parsing errors at the decoder side and the error may propagate. When an MV of a previous picture is decoded incorrectly, a mismatch between the MVP list at the encoder side and the MVP list at the decoder side may occur. Therefore, subsequent MV decoding may also be impacted and the condition may persist for multiple subsequent pictures.

In HM-4.0, in order to solve the parsing problem related to Merge/AMVP in HM-3.0, fixed MVP list size is used to decouple MVP list construction and MVP index parsing. Furthermore, in order to compensate the coding performance loss caused by the fixed MVP list size, additional MVPs are assigned to the empty positions in the MVP list. In this process, Merge index is coded using truncated unary codes of fixed length equal to 5 or less, and AMVP index is coded using fixed length equal to 2 or less.

Another change in HM-4.0 is the unification of MVP positions. Both Merge and Skip use the same positions shown in FIG. 6.

Additional bi-predictive Merge candidates are created using original Merge candidates. The additional candidates are divided into three candidate types:

Combined bi-predictive Merge candidate (candidate type 1)
Scaled bi-predictive Merge candidate (candidate type 2)
Zero vector Merge/AMVP candidate (candidate type 3)

In candidate type 1, combined bi-predictive Merge candidates are created by combining original Merge candidate. Two candidates in original candidates are used to create bi-predictive Merge candidates. An example of the derivation process of combined bi-predictive Merge candidate is shown in FIGS. 3A-C, where mvL0_A(uni) refers to a motion vector mvL0 in list 0 with the reference picture index refIdxL0 in list 0, and mvL1_B(uni) refers to a motion vector mvL1 in list 1 with the reference picture index refIdxL1 in list 1. The original candidates are used to generate combined bi-predictive candidates as indicated by arrows 310 and 320. FIG. 3A illustrates the original Merge candidate list and FIG. 3B illustrates the Merge candidate list after adding combined candidates.

In candidate type 2, scaled bi-predictive Merge candidates are created by scaling original Merge candidates. One of the original candidates is used to create bi-predictive Merge candidates. The selected candidate corresponds to a motion vector mvLX with the reference picture index refIdxLX in list X, where X can be 0 or 1. For example, one candidate A is uni-predictive in list 0 with motion vector mvL0_A and reference picture index ref0. In order to derived the scaled candidate, ref0 is copied to reference index ref0' in list 1 first. Then, mvL0'_A is calculated by scaling mvL0_A according to picture distance of current frame to ref0 and picture distance of current frame to ref0'. The bi-predictive Merge candidate, having mvL0_A and ref0 in list 0 and mvL0'_A and ref0' in list 1, are then created and added into Merge candidate list. FIGS. 4A-C illustrate an example of the derivation process of the scaled bi-predictive Merge candidate. FIG. 4A and FIG. B correspond to the original Merge candidate list and the Merge list after adding scaled candidates respectively, where the corresponding Merge candidate derivations are indicated by arrows 410 and 420. FIG. 4C illustrates the Merge candidate derivations indicated by arrows 410 and 420 along with related reference pictures.

In candidate type 3, zero-vector Merge candidates and zero-vector AMVP candidates are created by combining zero vectors and reference index that can be referred. FIGS. 5A-D illustrates an example of adding Zero vector Merge candidates and zero vector AMVP candidates. FIG. 5A and FIG. 5B illustrate the original Merge candidate list and the Merge candidate list after adding zero-vector candidates respectively. The added zero-vector candidates are indicated by the dashed box 510. FIG. 5C and FIG. 5D illustrate the original AMVP candidate list and the AMVP candidate list after adding zero-vector candidates respectively. The added zero-vector candidates are indicated by the dashed boxes 520 and 530 for list 0 and list 1 respectively. If a zero-vector candidate is not duplicated, it is added to the respective Merge and AMVP candidate set.

For AMVP in HM-4.0 FIG. 6 illustrates the neighboring PUs configuration to derive the spatial and temporal MVPs for both AMVP and Merge. In AMVP, the left MVP is the first available motion vector between $A_0$ and $A_1$. The top MVP is the first available motion vector among $B_0$, $B_1$ and $B_2$. The temporal MVP is the first available motion vector between $T_{BR}$ and $T_{CTR}$. $T_{BR}$ is used first and if $T_{BR}$ is not available and otherwise $T_{CTR}$ is used instead. If the left MVP is not available and the top MVP is not a scaled MVP, the second top MVP can be derived if there is a scaled MVP among $B_0$, $B_1$, and $B_2$. The number of MVPs in AMVP candidate set is 2 in HM-4.0. Therefore, after two spatial MVPs and one temporal MVP are derived, only the first two MVPs will be included in the candidate set. If the number of available MVPs is smaller than two after removing redundancy, then zero-vector candidates are added to the candidate set.

For Merge mode in HM-4.0, the MVP candidate derivation uses the same neighboring block configuration as shown in FIG. 6. Up to four spatial MVPs are derived from $A_0$, $A_1$, $B_0$ and $B_1$, and one temporal MVP is derived from $T_{BR}$ or $T_{CTR}$. $T_{BR}$ is used first if $T_{BR}$ is not available and otherwise $T_{CTR}$ is used instead. If any of the four spatial MVPs is not available, the block $B_2$ is then used to derive MVP as a replacement. After the four spatial MVPs and one temporal MVP are derived, redundancy is checked and any redundant MVP will be removed. If the number of available MVPs is smaller than five after removing redundancy, three types of additional candidates are derived and added to the candidate set.

As illustrated above, the fixed-size Merge/AMVP candidate sets are used in HM-4.0 to overcome the issue associated with parsing error. Moreover, new MVPs are added to the candidate set after removing redundant MVPs in order to improve coding efficiency. However, the MVP candidate derivation for HM-4.0 does not necessarily provide a complete full set of MVP candidates. The number of MVPs in the candidate set may be less than the fixed target size specified. When a parsing error occurs, the encoder and decoder may have different MVP list. If the encoder sends an MVP index pointing to an empty space, mismatch between the encoder and decoder may occur if the encoder and decoder have different MVP lists. The state of mismatch may persist and cause error propagation in the decoder. Accordingly, it is desirable to develop methods of generating additional MVM candidates that can always result in a complete full MVP candidate set.

BRIEF SUMMARY OF THE INVENTION

In one embodiment, a method is implemented in a video coder for deriving a motion vector predictor (MVP) candidate set for a block. The method comprises: determining a plurality of spatial neighboring blocks of the block; obtaining one or more spatial MVP candidates from motion vectors associated with the spatial neighboring blocks; determining whether one or more redundant MVP candidates exist in the spatial MVP candidates; generating a first MVP candidate set, wherein said generating the first MVP candidate set comprises not including the determined one or more redundant MVP candidates into the first MVP candidate set; and generating a final MVP candidate set according to the first MVP candidate set. The generating of the final MVP candidate set comprises: if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encoding or decoding the block using the final MVP candidate set;

wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

In another embodiment, an apparatus for derives a motion vector predictor (MVP) candidate set for a block. The apparatus comprises one or more circuits configured to: determine a plurality of spatial neighboring blocks of the block; obtain one or more spatial MVP candidates from motion vectors associated with the spatial neighboring blocks; determine whether one or more redundant MVP candidates exist in the spatial MVP candidates; generate a first MVP candidate set, wherein said generating the first MVP candidate set comprises not including the determined one or more redundant MVP candidates into the first MVP candidate set; and generate a final MVP candidate set according to the first MVP candidate set. The generation of the final MVP candidate set comprises: if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encode or decode the block using the final MVP candidate set; wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

In another embodiment, a non-transitory computer readable medium stores a computer-executable program. The computer-executable program, when executed, causing a video coder to perform the following steps: determining a plurality of spatial neighboring blocks of the block; obtaining one or more spatial MVP candidates from motion vectors associated with the spatial neighboring blocks; determining whether one or more redundant MVP candidates exist in the spatial MVP candidates; generating a first MVP candidate set, wherein said generating the first MVP candidate set comprises not including the determined one or more redundant MVP candidates into the first MVP candidate set; and generating a final MVP candidate set according to the first MVP candidate set. The generating of the final MVP candidate set comprises: if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encoding or decoding the block using the final MVP candidate set; wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

BRIEF DESCRIPTION OF THE DRAWINGS

FIGS. 5A-D illustrate an example of generating additional bi-predictive Merge candidates using zero-vector Merge/AMVP candidate based on original Merge candidates according to HM4.0.

DETAILED DESCRIPTION OF THE INVENTION

Figure 1:
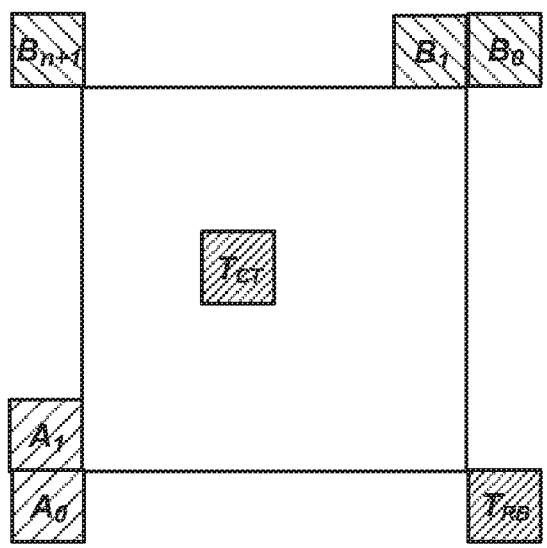
FIG. 1 illustrates an example of neighboring block configuration used to derive MVP candidate set for Inter mode based on AMVP scheme in HM3.0.
Figure 2:
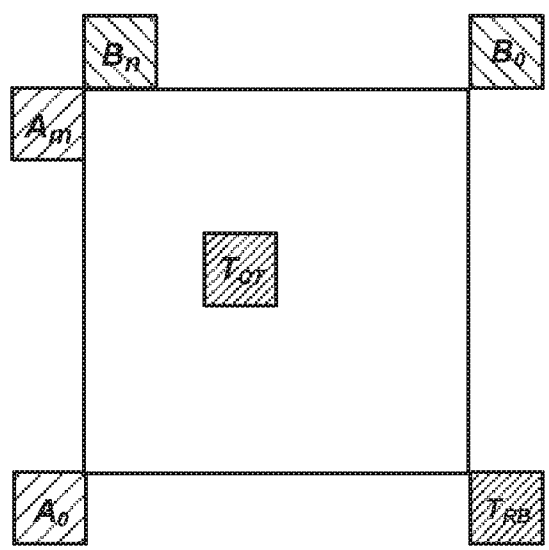
FIG. 2 illustrates an example of neighboring block configuration used to derive MVP candidate set for Skip and Merge modes in HM3.0.
Figures 3A, 3B, 3C:
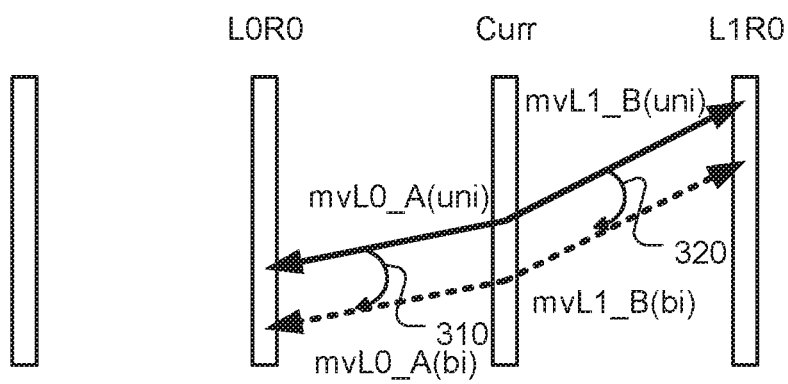
FIGS. 3A-C illustrate an example of generating additional bi-predictive Merge candidates using combined bi-predictive Merge candidate based on original Merge candidates according to HM4.0.
Figures 4A, 4B, 4C:
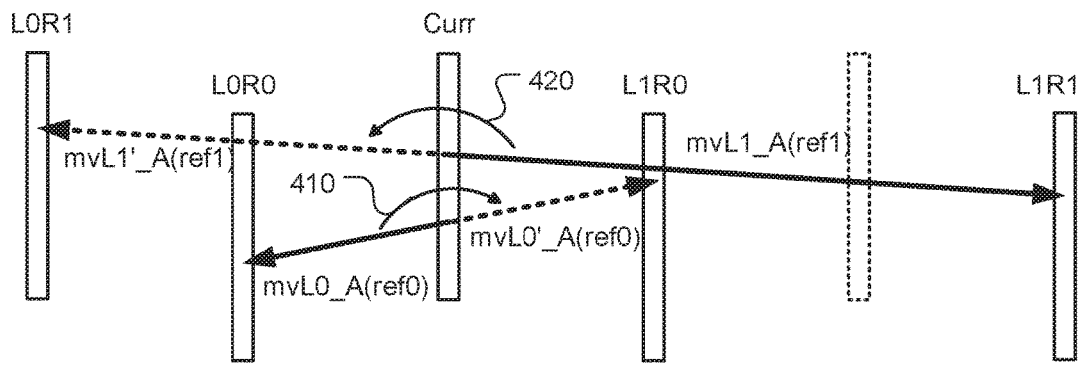
FIGS. 4A-C illustrate an example of generating additional bi-predictive Merge candidates using scaled bi-predictive Merge candidate based on original Merge candidates according to HM4.0.
Figure 6:
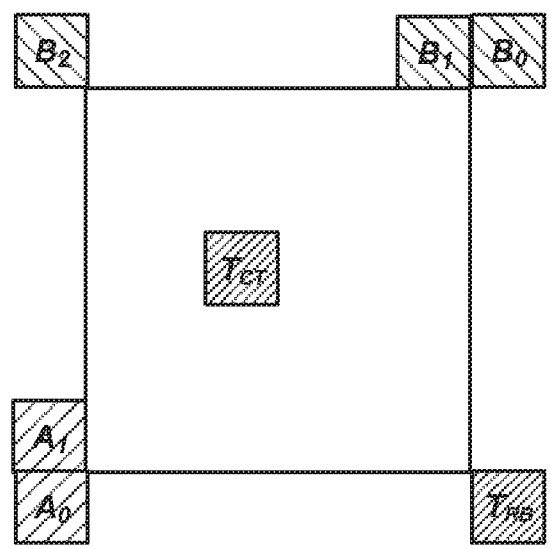
FIG. 6 illustrates an example of neighboring block configuration used to derive MVP candidate set for AMVP/Merge modes in HM4.0.
Figure 7:
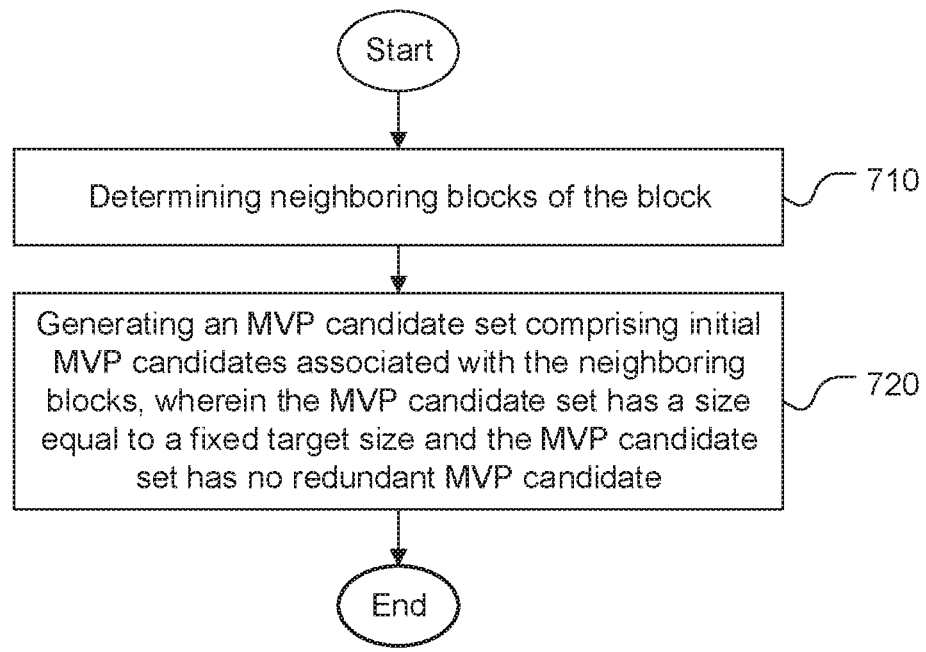
FIG. 7 illustrates an exemplary flow chart of a system incorporating an embodiment of the present invention, where initial values are assigned to the MVP candidates to generate a complete full MVP candidate set.

As mentioned before, mismatch between the encoder and decoder may occur when the encoder sends an MVP index pointing to an empty (undefined) space of the MVP candidate set. To overcome the mismatch issue between the encoder and decoder, embodiments of the present invention generate a complete full MVP candidate set. Therefore, there will be no more empty space in the MVP candidate set. One embodiment according to the present invention initializes each element of the MVP candidate set before applying the MVP candidate set generation process, where the MVP candidate set generation process can be a conventional approach. The initial MVP candidates are properly selected so that the MVP candidate set consisting of initial MVP candidates is complete and full. In other words, the size of the MVP candidate set is equal to a fixed target size and there is no redundant MVP candidate in the MVP candidate set. The values to be initialized for each element include MV in case of AMVP mode and prediction direction, reference index and MV in case of the Merge mode. FIG. 7 illustrates an exemplary flow chart of a system incorporating an embodiment of the present invention. The neighboring blocks are determined as shown in step 710. The MVP candidate set is then generated, where the MVP candidate set comprises initial MVP candidates associated with the neighboring blocks as shown in step 720. The MVP candidate set has a size equal to the fixed target size and the MVP candidate set has no redundant MVP candidate.

Figure 8:
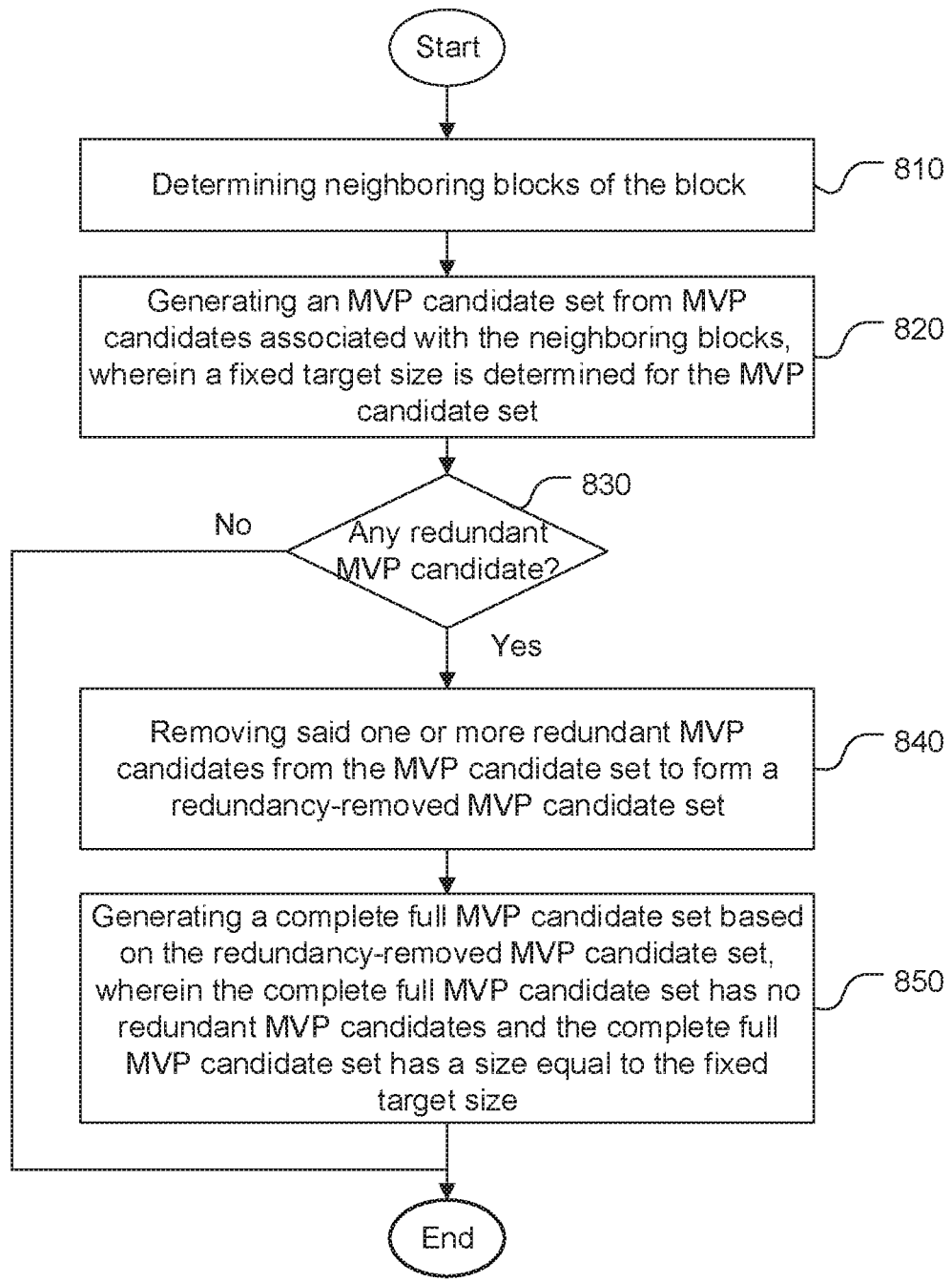
FIG. 8 illustrates an exemplary flow chart of a system incorporating an embodiment of the present invention, where the complete full MVP candidate set is generated from the redundancy-removed MVP candidate set.

According to another embodiment of the present invention, a value is assigned to each empty (undefined) MVP if there is any empty MVP in the candidate set after applying the MVP candidate set generation and redundant MVP removal process. The procedure to replace any redundant MVP candidate according to embodiments of the present invention ensures the resulted MVP candidate set is complete and full. In other words, the size of the MVP candidate set is equal to the fixed target size and there is no redundant MVP candidate in the MVP candidate set. FIG. 8 illustrates an exemplary flow chart of a system incorporating an embodiment of the present invention. The neighboring blocks are determined as shown in step 810 and MVP candidate set is generated from MVP candidates associated with the neighboring blocks as shown in step 820, wherein a fixed target size is determined for the MVP candidate set. The redundancy is then checked in step 830. If there is any redundant MVP candidate, it is removed as shown in step 840. A complete and full MVP candidate set is then generated from the redundancy-removed MVP candidate set as shown in step 850. If the test in step 830 indicates that there is no redundant MVP candidate, the procedure is terminated. In one embodiment, the method to generate the complete full MVP candidate set is to assign a value to each empty MVP candidate, where the value is non-redundant with respect to the redundancy-removed MVP candidate set. In other words, the value does not cause any redundancy if the value is added to the MVP candidate set. The values to be assigned include MV in case of the AMVP mode, and prediction direction, reference index and MV in case of the Merge mode. For example, the zero vector (0,0) can be added to replace the empty (undefined) MVP in the AMVP candidate set. The zero vector with reference picture in list 0, i.e., (0,0) with reference frame index equals to 0 and the zero vector with reference picture in list 1, i.e., (0,0) with reference frame index equals to 0 can be added to replace the empty (undefined) MVP in the Merge candidate set.

Figure 9:
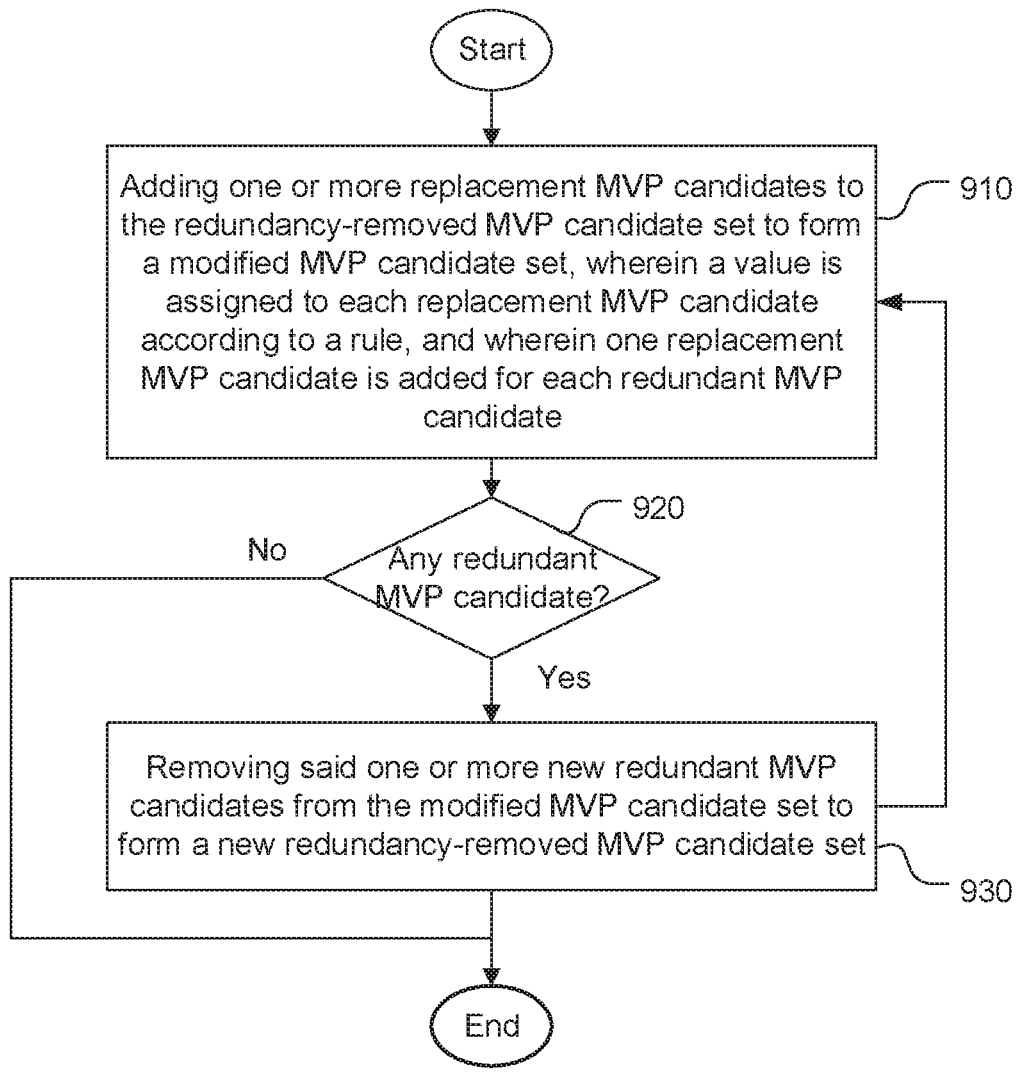
FIG. 9 illustrates an exemplary flow chart of a system incorporating an embodiment of the present invention, where an iterative process is used to generate the complete full MVP candidate set.

In yet another embodiment according to the present invention, the method to generate a complete full MVP candidate set is to assign a value to each empty (undefined) MVP according to a rule. The values to be assigned include MV in case of the AMVP mode and prediction direction, reference index and MV in case of the Merge mode. After replacement MVP candidates are added to the MVP candidate set, redundancy is checked and redundant MVP removal is applied again. The above procedure of assigning value, checking redundancy, and removing redundant MVP candidates are repeated until the MVP candidate set is complete and full. For example, motion vector corresponding to (x,0), (−x,0), (0,y) or (0,−y) can be added to one of the MVP candidate set to replace the empty (undefined) MVP, where x is an integer value corresponding to horizontal motion vector and y is also an integer corresponding to vertical motion vector. An exemplary flow chart for generating a complete full MVP candidate set according to an embodiment of the present invention is illustrated in FIG. 9. One or more replacement MVP candidates are added to the redundancy-removed MVP candidate set to form a modified MVP candidate set as shown in step 910, wherein a value is assigned to each replacement MVP candidate according to a rule. One replacement MVP candidate is added for each redundant MVP candidate. After one or more replacement MVP candidates are added, the redundancy is checked in step 920. If there is no more redundant MVP candidate, the MVP candidate set is complete and full, and the procedure can be terminated. Otherwise, the redundant MVP candidate is removed as shown in step 930 and the procedure goes back to step 910 again.

Flow charts in FIG. 7 to FIG. 9 are intended to illustrate examples of systems incorporating embodiment of the present invention. The specific arrangements and configuration of these steps shall not be construed as limitations to the present invention. Some steps may be re-arranged to practice the present invention without departing from the spirit of the present invention. Also, some steps may be combined and some steps may be split to practice the present invention.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method implemented in a video coder for deriving a motion vector predictor (MVP) candidate set for a block, the method comprising:
    determining a plurality of spatial neighboring blocks of the block;
    obtaining one or more spatial MVP candidates from motion vectors associated with the spatial neighboring blocks;
    determining whether one or more redundant MVP candidates exist in the spatial MVP candidates;

generating a first MVP candidate set, wherein said generating the first MVP candidate set comprises not including the determined one or more redundant MVP candidates into the first MVP candidate set;

generating a final MVP candidate set according to the first MVP candidate set, wherein said generating the final MVP candidate set comprises:

if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encoding or decoding the block using the final MVP candidate set;

wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

2. The method of claim 1, wherein said generating the first MVP candidate set further comprising:

generating the first MVP candidate set according to the spatial MVP candidates and one or more temporal candidates.

3. The method of claim 1, wherein the target size is a fixed and predetermined value.

4. The method of claim 1, wherein the target size is a predetermined value.

5. An apparatus for deriving a motion vector predictor (MVP) candidate set for a block, the apparatus comprising one or more circuits configured to:

determine a plurality of spatial neighboring blocks of the block;

obtain one or more spatial MVP candidates from motion vectors associated with the spatial neighboring blocks;

determine whether one or more redundant MVP candidates exist in the spatial MVP candidates;

generate a first MVP candidate set, wherein said generating the first MVP candidate set comprises not including the determined one or more redundant MVP candidates into the first MVP candidate set;

generate a final MVP candidate set according to the first MVP candidate set, wherein said generating the final MVP candidate set comprises:

if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encode or decode the block using the final MVP candidate set;

wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

6. The apparatus of claim 5, wherein the first MVP candidate set is generated according to the spatial MVP candidates and one or more temporal candidates.

7. The apparatus of claim 5, wherein the target size is a fixed and predetermined value.

8. The method of claim 5, wherein the target size is a predetermined value.

9. A non-transitory computer readable medium storing a computer-executable program, the computer-executable program, when executed, causing a video coder to perform the following steps:

determining a plurality of spatial neighboring blocks of the block;

obtaining one or more spatial MVP candidates from motion vectors associated with the spatial neighboring blocks;

determining whether one or more redundant MVP candidates exist in the spatial MVP candidates;

generating a first MVP candidate set, wherein said generating the first MVP candidate set comprises not including the determined one or more redundant MVP candidates into the first MVP candidate set;

generating a final MVP candidate set according to the first MVP candidate set, wherein said generating the final MVP candidate set comprises:

if a size of the first MVP candidate set is smaller than a target size, adding one or more pre-defined replacement MVP candidates to the first MVP candidate set until the size of the first MVP candidate set equal to the target size, and regarding the first MVP candidate set as the final MVP candidate set; and encoding or decoding the block using the final MVP candidate set;

wherein a value is assigned to each pre-defined replacement MVP candidate, wherein when the block is encoded or to be encoded by Merge mode, the value corresponds to one or a combination of prediction direction, reference index, and motion vector, and said one or more pre-defined replacement MVP candidates added to the first MVP candidate set comprise both a first zero vector with a reference frame index equal to 0 in list 0 and a second zero vector with a reference frame index equal to 0 in list 1, wherein when the block is encoded or to be encoded by Advanced Motion Vector Prediction (AMVP) mode, the value corresponds to motion vector (MV), and said one or more pre-defined replacement MVP candidates added to the first MVP candidate set comprise one or more zero vectors.

* * * * *